United States Patent
Schmidt (10) Patent No.: US 6,854,893 B2
(45) Date of Patent: Feb. 15, 2005

(54) SEALING ARRANGEMENT FOR A ROLLING-CONTACT BEARING

(75) Inventor: Werner Schmidt, Herzogenaurach (DE)

(73) Assignee: INA-Schaeffler KG, Herzogenaurach (DE)

(*) Notice: Subject to any disclaimer, the term of this patent is extended or adjusted under 35 U.S.C. 154(b) by 0 days.

(21) Appl. No.: 10/462,587

(22) Filed: Jun. 13, 2003

(65) Prior Publication Data
US 2004/0005102 A1 Jan. 8, 2004

Related U.S. Application Data

(63) Continuation of application No. PCT/EP01/14425, filed on Dec. 7, 2001.

(30) Foreign Application Priority Data

Dec. 13, 2000 (DE) .......................................... 100 61 995

(51) Int. Cl.[7] .............................................. F16C 33/78
(52) U.S. Cl. ...................................... 384/486; 384/477
(58) Field of Search ................................ 384/477, 484, 384/485, 486, 478

(56) References Cited

U.S. PATENT DOCUMENTS

| | | | |
|---|---|---|---|
| 2,405,122 A | | 8/1946 | Firth |
| 3,393,021 A | | 7/1968 | Guth |
| 3,770,993 A | * | 11/1973 | Schultenkamper .......... 384/484 |
| 3,869,182 A | * | 3/1975 | Glifberg ..................... 384/485 |
| 4,025,132 A | | 5/1977 | Watanabe |
| 4,408,808 A | | 10/1983 | Redmann |
| 4,792,243 A | * | 12/1988 | Takeuchi et al. ............ 384/486 |
| 4,863,293 A | | 9/1989 | Sytsma |
| 5,046,868 A | * | 9/1991 | Albert ......................... 384/477 |
| 5,860,748 A | * | 1/1999 | Okumura et al. ........... 384/486 |

FOREIGN PATENT DOCUMENTS

| | | |
|---|---|---|
| DE | 5 61 467 C | 10/1932 |
| DE | 9 53 597 C | 12/1956 |
| DE | 10 04 437 B | 3/1957 |
| DE | 17 66 801 U | 5/1958 |
| DE | 10 39 802 B | 9/1958 |
| DE | 14 25 068 A | 12/1968 |
| DE | 21 21 816 A | 11/1972 |
| DE | 35 14 203 C | 7/1986 |
| DE | 41 33 777 A1 | 4/1993 |
| DE | 299 04 179 U1 | 8/1999 |
| EP | 02 76 877 A2 | 8/1988 |
| EP | 02 76 877 A3 | 8/1988 |
| FR | 2 479 374 A | 10/1981 |
| FR | 2 747 747 A | 10/1997 |

* cited by examiner

*Primary Examiner*—Thomas R. Hannon
(74) *Attorney, Agent, or Firm*—Henry M. Feiereisen (57) ABSTRACT

A two-stage sealing arrangement for sealing an annular gap between an outer bearing ring and an inner bearing ring of a rolling-contact bearing, includes a first sealing element securely fixed to the outer bearing ring and having at least one sealing lip supported against the inner bearing ring. A second sealing element is disposed at an axial distance to the first sealing element, thereby defining a circular ring shaped sealing gap in a radial direction for accommodating, at least partially, a sealing material.

21 Claims, 5 Drawing Sheets

SEALING ARRANGEMENT FOR A ROLLING-CONTACT BEARING

CROSS-REFERENCES TO RELATED APPLICATIONS

This application is a continuation of prior filed copending PCT International application no. PCT/EP01/14425, filed Dec. 7, 2001, on which priority is claimed under 35 U.S.C. § 120, the disclosure of which is hereby incorporated by reference.

This application claims the priority of German Patent Application, Serial No. 100 61 995.9, filed Dec. 13, 2000, pursuant to 35 U.S.C. 119(a)–(d), the disclosure of which is incorporated herein by reference.

BACKGROUND OF THE INVENTION

The present invention relates to a sealing arrangement for a rolling-contact bearing, in particular groove ball bearing.

German patent publication DE 41 33 777 describes a rolling-contact bearing with an inner bearing ring, an outer bearing ring, and rolling elements disposed between the inner and outer bearing rings. The rolling-contact bearing is provided to support a tension roller of a belt drive, with a seal disposed on one side of the rolling elements and another seal disposed on the other side of the rolling elements. The seals are secured to the outer bearing ring and seal an annular gap radially bounded by the bearing rings, whereby each seal has a sealing lip for support against the outer surface area of the inner bearing ring. While the arrangement of these seals may in some instances be sufficient to inhibit ingress of contaminants into the rolling-contact bearing or escape of lubricant from the rolling-contact bearing, when, for example, installed in a tension roller for protection against splash water. However, this seal arrangement is ineffective for vehicles operated off-road operation and situations, when the vehicle is driven through water or subject to significant ingress of dirt into the installation space intended for the internal combustion engine. To tackle this problem, the use of lids has been proposed which are typically snapped on to the hub of the tension roller and completely cover the rolling-contact bearing on one side. Still, under more extreme situations, these lids proved to be unsatisfactory in order to provide an effective protection because moisture crept in via the snapped connection into the intermediate spaced bounded by the lid and ultimately migrated via the sealing lip into the rolling-contact bearing. Moreover, another shortcoming resides in the fact that the lid can be attached only on one side of the rolling-contact bearing.

It would therefore be desirable and advantageous to provide an improved sealing arrangement for a rolling-contact bearing to obviate prior art shortcomings and to enable a protection even under extreme situations.

SUMMARY OF THE INVENTION

According to one aspect of the present invention, a sealing arrangement for sealing on both sides of a rolling-contact bearing an annular gap which is defined between an outer bearing ring and an inner bearing ring of the rolling-contact bearing at a distance to rolling elements received between the inner and outer bearing rings, includes a first sealing element securely fixed to the outer bearing ring and having at least one sealing lip supported against the inner bearing ring, a second sealing element disposed at an axial distance to the first sealing element for effecting a two-stage sealing action, said first and second sealing elements defining a circular ring shaped sealing gap which extends in a radial direction, and a sealing material disposed in the sealing gap at least in a partial region thereof.

The present invention resolves prior art problems by providing a two-stage sealing arrangement on either side of the rolling elements through disposition of a separate second sealing element at an axial distance to the first sealing element. In this way, the effectiveness of the sealing action is significantly enhanced and a maintenance-free bearing is ensured. Incorporation of sealing material, which forms a closed circle within the sealing gap, further improves the sealing action.

According to another feature of the present invention, the second sealing element may be a sealing disk which is secured in fixed rotative engagement to the inner bearing ring and may have a thin-walled configuration. The sealing disk may be made of a metallic material through a process without material removal and can be combined with typical components, especially the rolling-contact bearing, without adversely affecting the overall construction. The sealing disk may include a disk element which is formed with a central mounting hole of a same diameter as the inner bearing ring, and radially extends across the annular gap defined between the inner and outer bearing rings. The disk element may be provided in an area between the inner and outer bearing rings with a recessed zone for realizing the sealing gap between the first sealing element and the sealing disk. This recessed area thus faces away from the rolling elements and is disposed in the area of the annular gap between the bearing rings, and extends up to the outer circumference.

According to another feature of the present invention, an elastic sealing lip may be disposed in outer surrounding relationship to the sealing disk and supported by an end surface of the outer bearing ring. The sealing lips of the first sealing element and the sealing disk are thus supported by different bearing rings thereby further improving the effectiveness of the two-stage sealing arrangement on either side of the rolling elements. The elastic sealing lip may be vulcanized at the outer circumference of the disk element. Of course, other types of fixation are conceivable as well such as, e.g., gluing, of form-fitting connection in which the sealing lip encompasses the outer contour of the disk element by a continuous groove.

The sealing gap, which has a circular ring shaped configuration for receiving the sealing material, is open radially outwards, whereby the first sealing element, which is directly received in the rolling-contact bearing, is supported via the sealing lip upon the inner bearing ring. The sealing material thus effectively provides a pre-sealing action for the sealing lip which is in sliding contact with the inner bearing ring. As a result, ingress of contaminants as well as liquids of any kind is prevented into the rolling-contact bearing, so that the sealing arrangement is effective to comply with special requirements demanded for operation of off-road vehicles or military vehicles or for use of vehicles under extreme conditions, e.g. when components of the vehicle and thus of the internal combustion engine momentarily are immersed in water. In addition, maintenance of the sealing arrangement is easy and installation of the sealing arrangement can be realized within the existing installation space so that the use of typical rolling-contact bearings is possible. Moreover, there is no need to modify existing parts for attachment of the sealing arrangement according to the invention so that the installation of the two-stage sealing arrangement will not result in added costs.

A sealing arrangement according to the present invention is especially suitable for rolling-contact bearings used in components of the traction drive of an internal combustion engine. The sealing arrangement for the rolling-contact bearing is comprised of two stages in axial direction to effectively prevent ingress of dirt and/or moisture into the rolling-contact bearing of a tension roller, deflection roller or tensioner, even when the off-road vehicle is operated under extreme conditions.

According to another feature of the present invention, the rolling-contact bearing may be disposed in a cylindrical portion of a carrier ring which is formed with a terminal radial collar to define the second sealing element. The radial collar is arranged in axial spaced-apart relationship to the first sealing element and extends in radial direction beyond the annular gap between the bearing rings. The axial distance between the first sealing element and the collar of the carrier ring defines hereby the sealing gap for receiving the sealing material.

A two-stage sealing arrangement can also be implemented by configuring the second sealing element as a radial shoulder of a housing pin provided for centered support of the inner bearing ring of the rolling-contact bearing. The radial shoulder is hereby disposed at an axial distance to the first sealing element of the rolling-contact bearing so as to establish the sealing gap for receiving the sealing material.

The two-stage sealing arrangements on either side of the rolling-contact bearing may be identical or configured differently. According to one construction, the rolling-contact bearing, situated on the tension arm or the side facing away from the internal combustion engine, may be provided with a separate sealing disk in axial spaced-apart relationship to the first sealing element. On the other side of the rolling-contact bearing, the seal arrangement is configured in a way that the first sealing element defines together with the collar of the carrier ring or the shoulder of the housing pin the sealing gap. Of course, other combinations are conceivable as well. For example, a sealing disk may be associated to both sides of the rolling-contact bearing, or a carrier ring may be combined with a housing pin.

According to another feature of the present invention, the sealing material may be a ring-shaped grease portion. This additional grease provides a lasting and effective sealing action against ingress of moisture into the rolling-contact bearing. Greasing in this way is cost-efficient and easy to introduce into the sealing gap: The sealing material may also be configured as a felt ring or washer which can be, for example, directly secured to the first sealing element in sealing sliding contact with the sealing disk, or the collar of the carrier ring, or the shoulder of the housing pin. Other sealing material suitable for introduction in the sealing gap may be conceivable as well.

According to another feature of the present invention, the first sealing element may be securely fixed in an annular groove located at an axial distance to an end surface of the outer bearing ring and is dimensioned long enough to extend to the inner bearing ring for support with a sealing lip against the inner bearing ring. The first sealing element may include a reinforcement, which extends to an area in close proximity of an outer surface area of the inner bearing ring.

According to another feature of the present invention, the sealing lip of the first sealing element may engage in a circumferential groove of the inner bearing ring at an axial distance to the end surface of the inner bearing ring and is disposed in sliding contact with a wall surface of the circumferential groove. In order to automatically implement a pressure equilibrium in the interior space of the rolling-contact bearing, the sealing lips of the first sealing element on opposite sides of the rolling-contact bearing may bear on either one of the right or left wall surfaces of the pertaining circumferential groove. This arrangement enables a pressure compensation in both directions, i.e. when an overpressure is encountered in the interior space of the rolling-contact bearing, the sealing lip of one sealing element detaches momentarily from the wall surface, while the other sealing lip momentarily detaches from the other wall surface, when a vacuum or a differential pressure is encountered between the ambient atmosphere and the interior space of the rolling-contact bearing. As an alternative, one of the sealing lips may have a radial vent groove in the area of support of the sealing lip upon the wall surface to enable a pressure equilibrium in both directions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
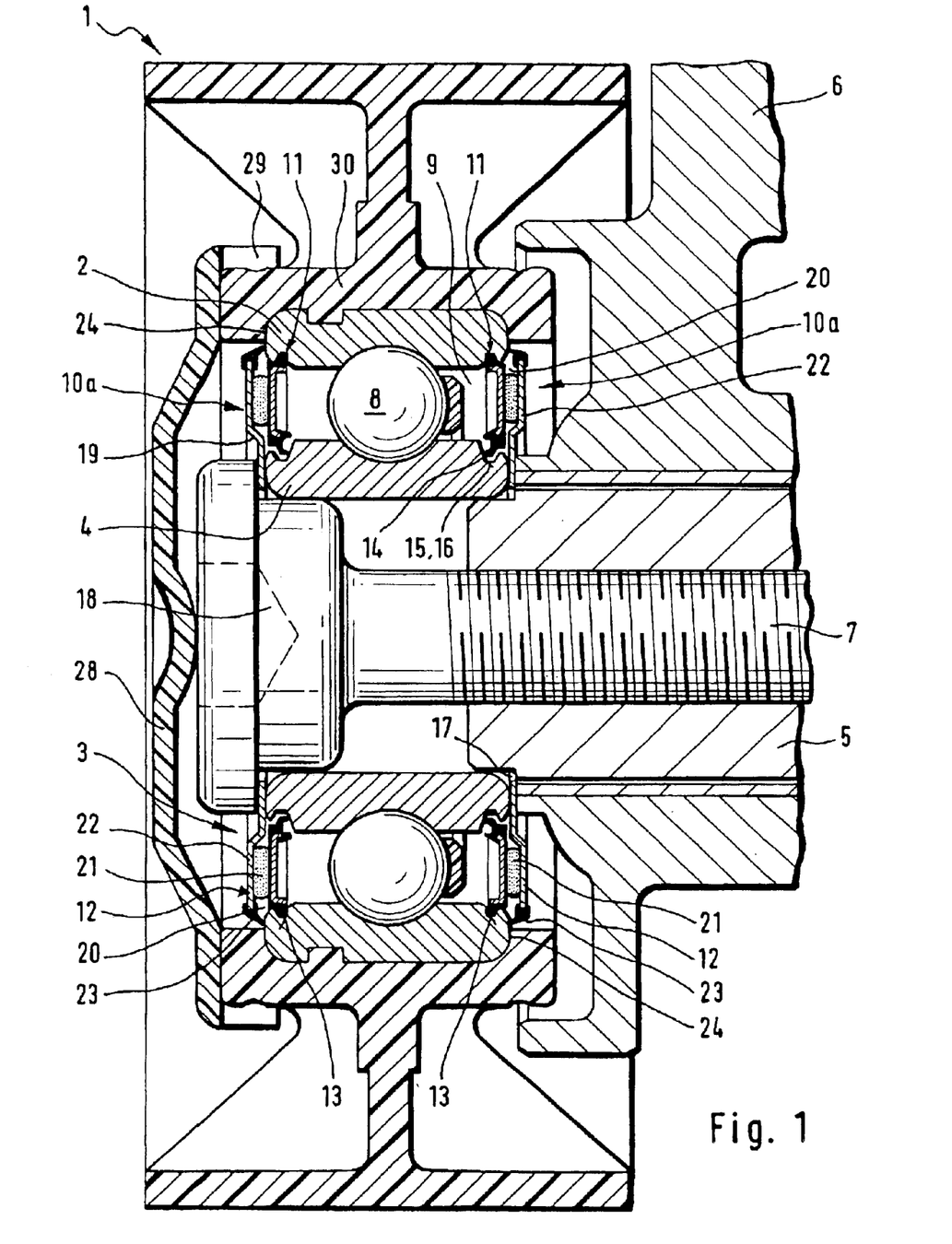
FIG. 1 is a sectional view of a tension roller supported by a rolling-contact bearing and having incorporated therein a first embodiment of a two-stage sealing arrangement according to the present invention disposed on, either side of the rolling-contact bearing.

Turning now to the drawing, and in particular to FIG. 1, there is shown a sectional view of a tension roller, generally designated by reference numeral 1 and provided for a traction drive. The tension roller 1 is made of plastic and form-fittingly embraces an outer bearing ring 2 of a rolling-contact bearing, generally designated by reference numeral 3 and configured as groove ball bearing. The rolling-contact bearing 3 includes an inner bearing ring 4 for centered support of the rolling-contact bearing 3 on a cylindrical stub 5 of housing 6. A screw fastener 7 connects the rolling-contact bearing 3 in forced manner with the housing 6. Rolling elements 8 are received between the outer and inner bearing rings 2, 4.

Provided on each side of the rolling elements 2 is a two-stage sealing arrangement, generally designated by reference numeral 10a, for sealing the rolling-contact bearing 3. As the sealing arrangements 10a on either side of the rolling-contact bearing 3 are of an identical construction, it will be understood by persons skilled in the art that a description of one of the sealing arrangements 10a is equally applicable to the other sealing arrangement 10a.

The sealing arrangement 10a is used to seal an annular gap 9 formed between the bearing rings 2, 4 and includes a first sealing element 11, which is secured in place via an annular groove 13 in the outer bearing ring 2, and a second sealing element in the form of a sealing disk 12, which is positioned at an axial distance to the first sealing element 11. The sealing element 11 has a sealing lip 14 for support against the inner bearing ring 4, whereby the sealing lip 14 is in sliding contact with a wall surface 15 of a circumferential groove 16 of the inner bearing ring 4. The sealing disk 12 has a disk element 22 which is made of a metallic material, preferably through a non-cutting process, and has a central mounting hole 17 for centered attachment to a collar 18 of the screw fastener 7. The mounting hole 17 has a diameter which substantially corresponds to the diameter of the inner bearing ring 4. The sealing disk 12 extends in radial direction beyond the inner contour of the outer bearing ring 2. In the area of the annular gap 9 between the bearing rings 2, 4, the sealing disk 12 is provided with a recessed area 19 away from the rolling elements 8. The recessed area 19 defines a circular ring shaped sealing gap 20 of same distance across the entire radial length for introduction of a sealing material in the form of ring-shaped grease portion 21. Placed around the outer circumference of the disk element 22 of the sealing disk 12 and extending between the sealing disk 12 and the outer bearing ring 2 is an elastic sealing lip 23 which is supported against a confronting end surface 24 of the outer bearing ring 2. In this way, the sealing action of the grease portion 21 in the sealing gap 20 can be complemented by the sealing action of the sealing lip 23. Of course, it may be sufficient to use the sealing lip 23 alone as an alternative to the grease portion 21.

The tension roller 1 is provided with a central lid 28, which is preferably made of plastic, for axially covering the entire rolling-contact bearing 3 including the screw fastener 7. By means of axial clips 29, the lid 28 is snapped to a hub 30 of the tension roller 1.

Figure 2:
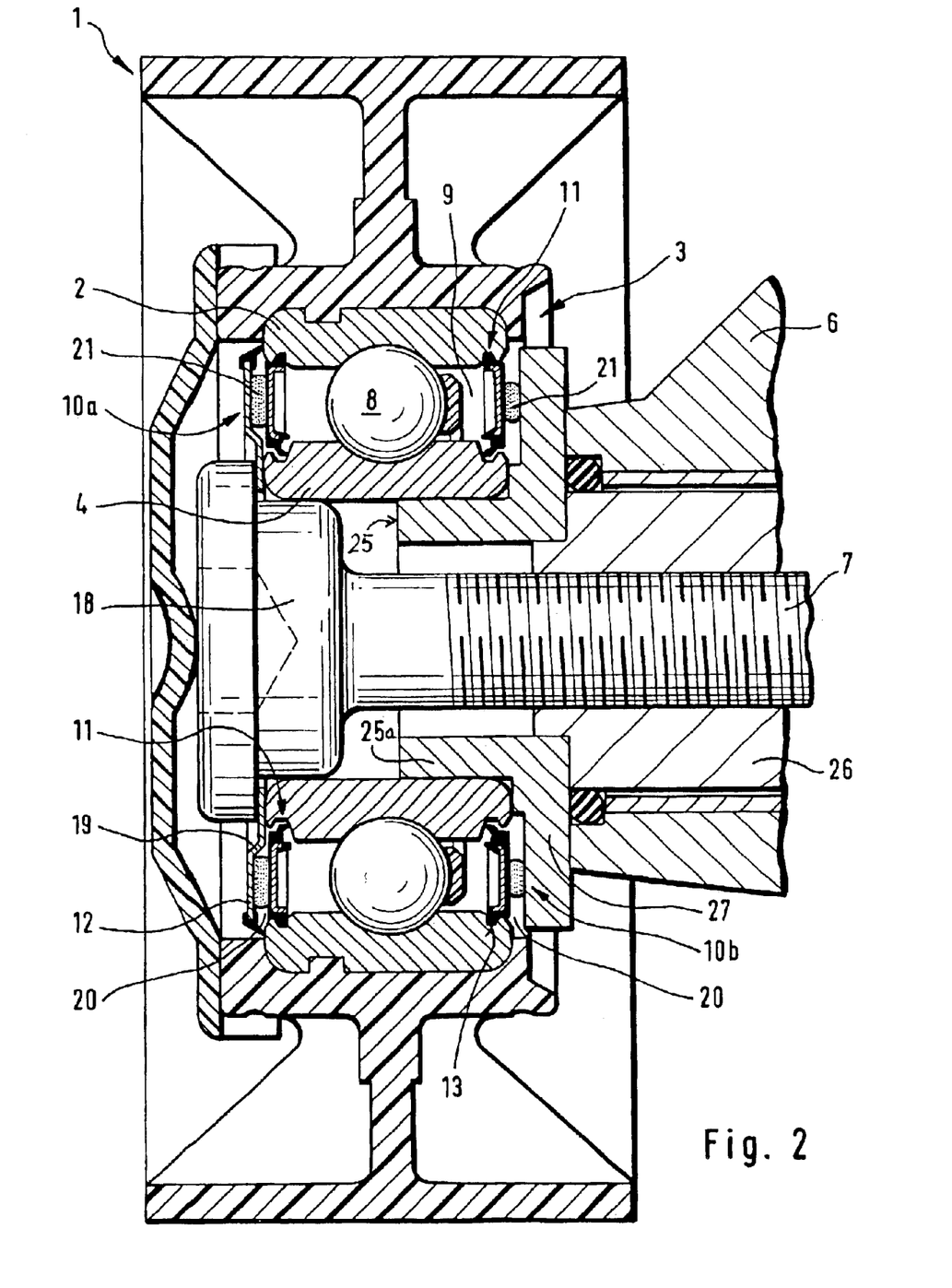
FIG. 2 is a sectional view of a tension roller supported by a rolling-contact bearing and having incorporated therein the two-stage sealing arrangement of FIG. 1 on one side and a second embodiment of a two-stage sealing arrangement according to the present invention on the other side of the rolling contact bearing.

Turning now to FIG. 2, there is shown a sectional view of a tension roller 1 supported by a rolling-contact bearing 3 and having incorporated therein the two-stage sealing arrangement 10a on one side and a second embodiment of a sealing arrangement according to the present invention, generally designated by reference numeral 10b on the other side of the rolling-contact bearing 3. Parts corresponding with those in FIG. 1 are denoted by identical reference numerals and not explained again. In this embodiment, the rolling-contact bearing 3 is centered on a carrier ring, generally designated by reference numeral 25 and connected to a housing 26, whereby the inner bearing ring 4 is restrained on a cylindrical portion 25a of the carrier ring 25. The cylindrical portion 25a terminates in a wrap-around radial collar 27 which extends to the contour of the outer bearing ring 2. In the area of the annular gap 9, the collar 27 extends at an axial distance to the sealing element 11, thereby defining the sealing gap 20 for accommodation of the grease portion 21 or other suitable sealing material, e.g. a felt ring.

Figure 3:
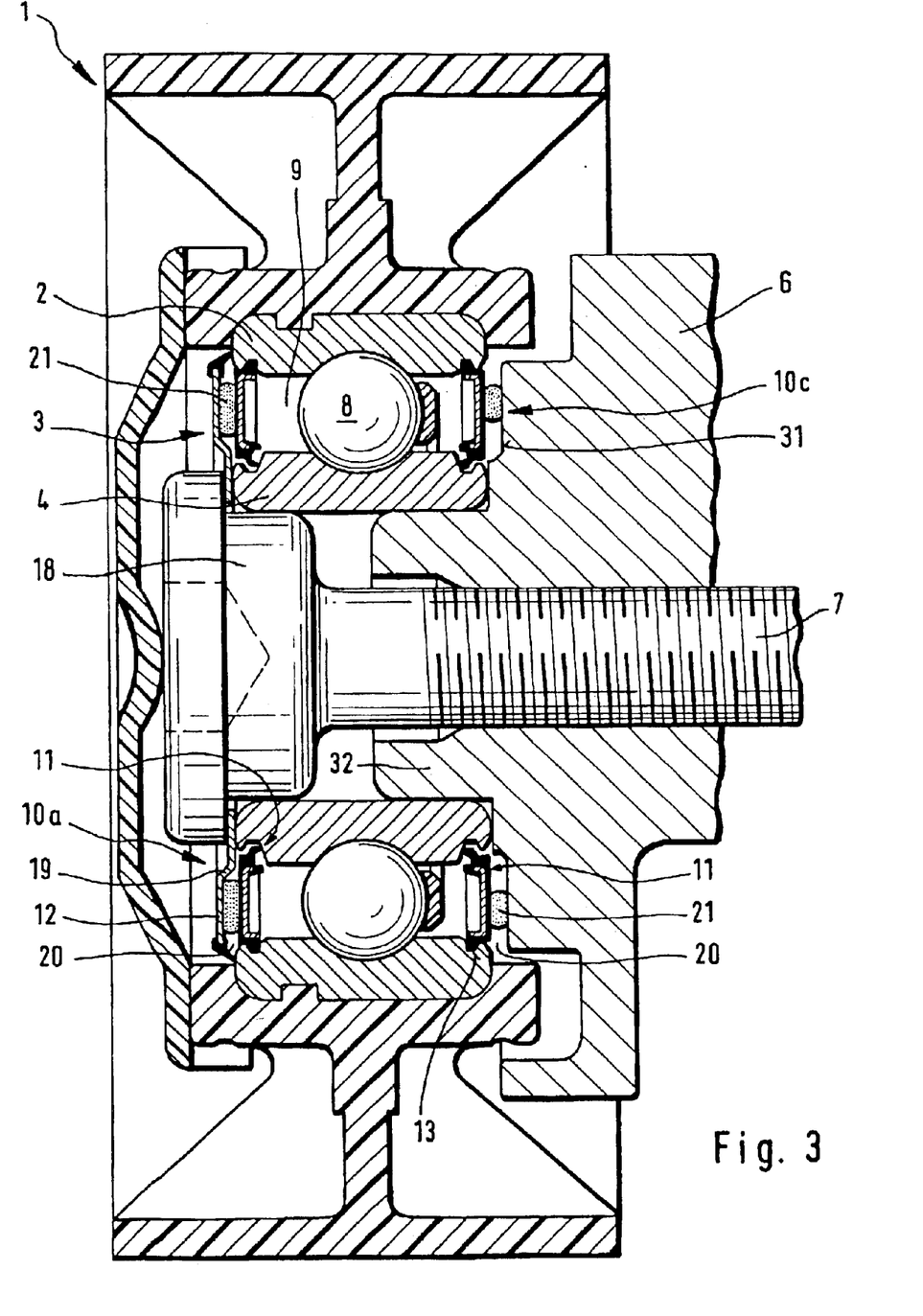
FIG. 3 is a sectional view of a tension roller supported by a rolling-contact bearing and having incorporated therein the two-stage sealing arrangement of FIG. 1 on one side and a third embodiment of a two-stage sealing arrangement according to the present invention on the other side of the rolling contact bearing.

FIG. 3 shows a sectional view of a tension roller 1 supported by a rolling-contact bearing 3 and having incorporated therein the two-stage sealing arrangement 10a on one side and a third embodiment of a sealing arrangement according to the present invention, generally designated by reference numeral 10c on the other side of the rolling-contact bearing 3. The description below will center on the differences between the embodiments and in particular on the configuration of the sealing arrangement 10c. In the embodiment of FIG. 3, the sealing gap 20 is defined in axial direction by the sealing element 11 and a radial shoulder 31 which is connected to a cylindrical housing pin 32, with the inner bearing ring 4 being centered on the housing pin 32. Disposed at least partially in the sealing gap 20 is a sealing material, e.g. the grease portion 21.

Figure 4:
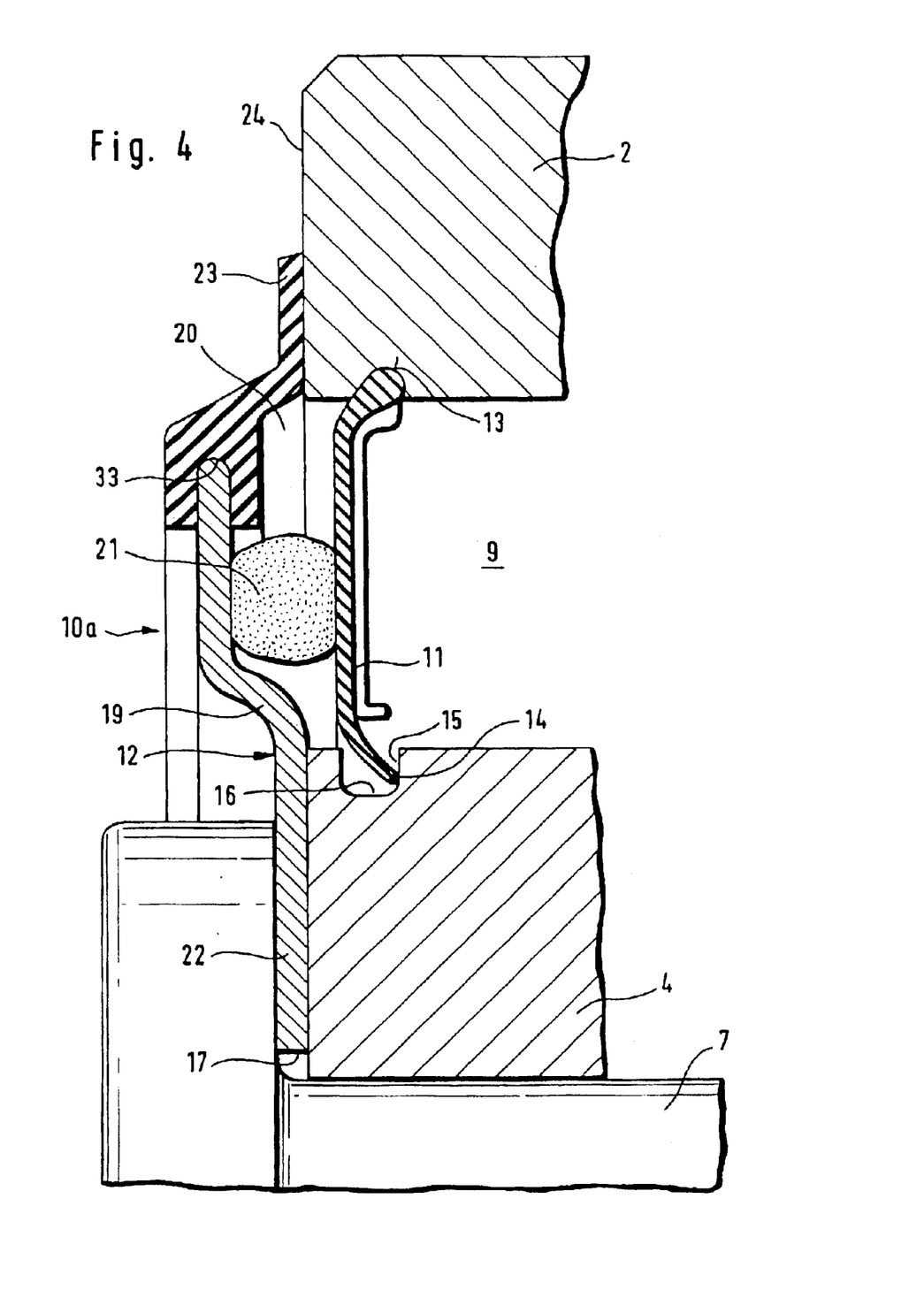
FIG. 4 is a detailed sectional view, on an enlarged scale, of the sealing arrangement of FIG. 1 on one side of the rolling-contact bearing.

Turning now to FIG. 4, there is shown a detailed sectional view, on an enlarged scale, of the sealing arrangement 10a to more clearly show the configuration of the sealing gap 20. The disk element 22 of the sealing disk 12 is shaped from sheet metal through a process without material removal and includes in the area of the annular gap 9 between the bearing rings 2, 4 the outwardly recessed zone 19, thereby defining the sealing gap 20 for accommodation of the grease portion 21 as sealing material. The outer perimeter of the disk element 22 is embraced by the elastic sealing lip 23 which is form-fittingly connected with the disk element 22 via a tongue and groove joint. Of course, other connections between the sealing lip 23 and the disk element 22 are conceivable as well. Examples include vulcanization or gluing of the sealing lip 23 onto the disk element 22. As the disk element 22 has a thin-walled configuration, the sealing lip 23 can be combined with existing components so that the two-stage sealing arrangement 10a can easily be added, if needed, or installed without need for particular parts.

Figure 5:
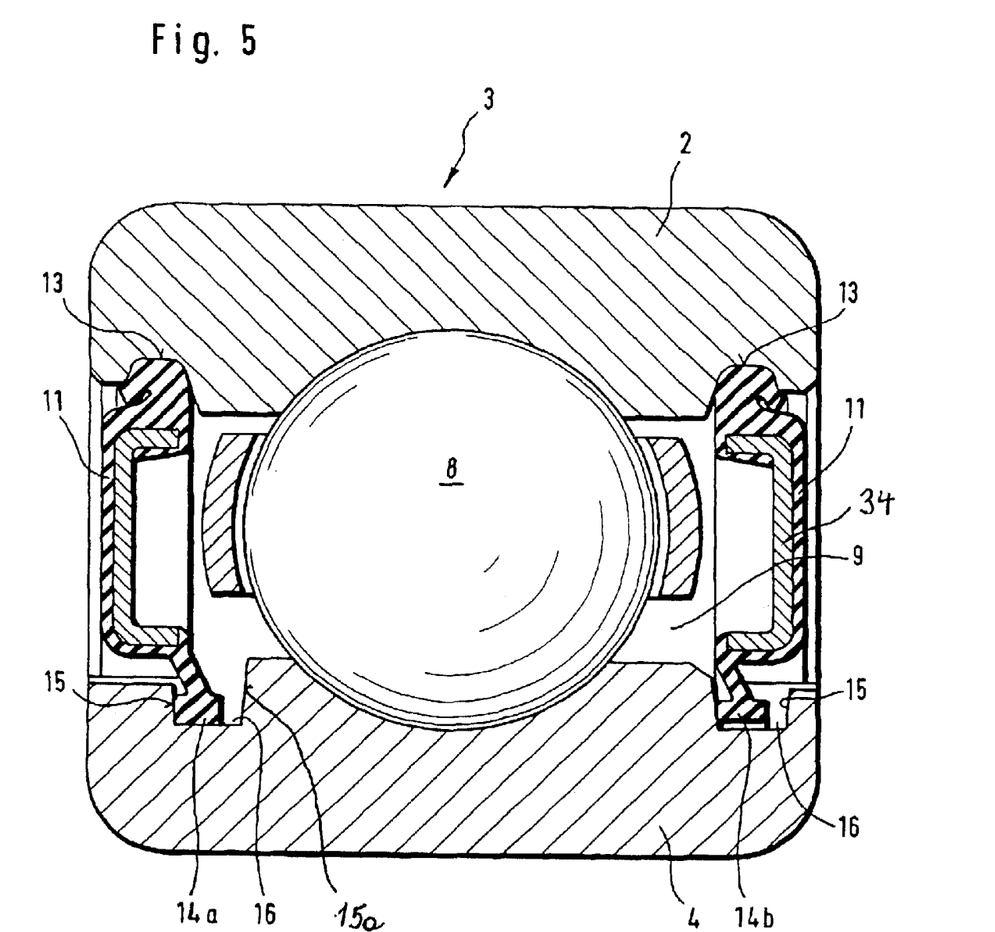
FIG. 5 is a detailed half-section, on an enlarged scale, of a rolling-contact bearing and having incorporated therein the sealing arrangement of FIG. 1.

FIG. 5 shows an exemplified illustration of the rolling-contact bearing 3, with the inner bearing ring 4 including a circumferential groove 16 which is demarcated by opposite wall surfaces 15 and 15a. In order to realize a pressure compensation between the interior space of the rolling-contact bearing 3 and the atmosphere, the sealing lips 14a, 14b of the sealing elements 11 on either side of the rolling-contact bearing 3 are respectively supported against the left-hand wall surface, i.e. the sealing lip 14a bears upon the wall surface 15, which is in distal relationship to the rolling elements 8, whereas the sealing lip 14b bears upon the wall surface 15a, which is in proximal relationship to the rolling elements 8. As a consequence of this arrangement of the sealing lips 14a, 14b, any pressure differential is automatically equalized. An overpressure in the interior of the rolling-contact bearing 3 in relation to the ambient atmosphere is equalized by momentarily lifting the sealing lip 14b from the wall surface 15a. In case of an underpressure in the interior of the rolling-contact bearing 3 in relation to the ambient atmosphere, the sealing lip 14a lifts off the wall surface 15 to realize a pressure equilibrium.

A pressure equilibrium can, of course, also be established by disposing the sealing lips 14a, 14b in symmetric relationship, i.e. the sealing lips 14a, 14b bear upon the same one of the wall surfaces 15, 15a, for example upon the outer wall surface 15. In this case, one of the sealing lips 14a, 14b is provided with at least one vent groove in the area of support of the sealing lip upon the wall surface.

As further shown in FIG. 5, the first sealing element 11 has fitted therein a reinforcement 34 which extends to an area in close proximity of an outer surface area of the inner bearing ring 4.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A sealing arrangement for sealing on both sides of a rolling-contact bearing an annular gap which is defined between an outer bearing ring and an inner bearing ring of the rolling-contact bearing at a distance to rolling elements received between the inner and outer bearing rings, said sealing arrangement comprising:
    a first sealing element securely fixed to the outer bearing ring and having at least one sealing lip supported against the inner bearing ring;
    a second sealing element disposed at an axial distance to the first sealing element for effecting a two-stage sealing action, said first and second sealing elements defining a circular ring shaped sealing gap which extends in a radial direction;
    a sealing material disposed in the sealing gap at least in a partial region thereof; and
    an elastic sealing lip disposed in outer surrounding relationship to the second sealing element and supported on an axial outer end surface of the outer bearing ring.

2. The sealing arrangement of claim 1, wherein the second sealing element is a sealing disk which is secured in fixed rotative engagement to the inner bearing ring.

3. The sealing arrangement of claim 2, wherein the sealing disk is made of a metallic material through a process without material removal and includes a disk element formed with a central mounting hole and radially extending across the annular gap between the inner and outer bearing rings 4. The sealing arrangement of claim 3, wherein the disk element is provided in an area between the inner and outer bearing rings with a recessed zone for realizing the sealing gap between the first sealing element and the sealing disk.

5. The sealing arrangement of claim 3, wherein the mounting hole has a diameter which corresponds to a diameter of the inner bearing ring.

6. The sealing arrangement of claim 1 for a rolling-contact bearing disposed in a pulley or tension roller of a traction drive.

7. The sealing arrangement of claim 1, wherein the sealing material is a grease portion.

8. A sealing arrangement for sealing on both sides of a rolling-contact bearing an annular gap which is defined between an outer bearing ring and an inner bearing ring of the rolling-contact bearing at a distance to rolling elements received between the inner and outer bearing rings, said sealing arrangement comprising:
    a first sealing element securely fixed to the outer bearing ring and having at least one sealing lip supported against the inner bearing ring, said first sealing element being securely fixed in an annular groove formed at an axial distance to an end surface of the outer bearing ring and having a sealing lip for support against the inner bearing ring, said first sealing element including a reinforcement extending to an area in close proximity of an outer surface area of the inner bearing ring;
    a second sealing element disposed at an axial distance to the first sealing element for effecting a two-stage sealing action, said first and second sealing elements defining a circular ring shaped sealing gap which extends in a radial direction; and
    a sealing material disposed in the sealing gap at least in a partial region thereof,
    wherein the sealing lip has a radial vent groove in the area of support of the sealing lip upon the wall surface.

9. The sealing arrangement of claim 8, wherein the sealing lip engages in a circumferential groove of the inner bearing ring at an axial distance to the end surface of the inner bearing ring and is in sliding contact with a wall surface of the circumferential groove.

10. The sealing arrangement of claim 9, wherein the wall surface for support of the sealing lip is one of the left wall surface and right wall surface of the circumferential groove.

11. The sealing arrangement of claim 8 for a rolling-contact bearing disposed in a pulley or tension roller of a traction drive.

12. The sealing arrangement of claim 8, wherein the sealing material is a grease portion.

13. A sealing arrangement for sealing on both sides of a rolling-contact bearing an annular gap which is defined between an outer bearing ring and an inner bearing ring of the rolling-contact bearing at a distance to rolling elements received between the inner and outer bearing rings, said sealing arrangement comprising:
    a first sealing element securely fixed to the outer bearing ring and having at least one sealing lip supported against the inner bearing ring;
    a second sealing element disposed at an axial distance to the first sealing element for effecting a two-stage sealing action, said first and second sealing elements defining a circular ring shaped sealing gap which extends in a radial direction; and
    a sealing material disposed in the sealing gap at least in a partial region thereof, wherein the sealing material is a felt ring.

14. The sealing arrangement of claim 13 for a rolling-contact bearing disposed in a pulley or tension roller of a traction drive.

15. The sealing arrangement of claim 13, wherein the sealing material is a grease portion.

16. A sealing arrangement for sealing on both sides of a rolling-contact bearing an annular gap which is defined between an outer bearing ring and inner bearing ring of the rolling-contact bearing at a distance to rolling elements received between the inner and outer bearing rings, said sealing arrangement comprising:
    a first sealing element securely fixed to the outer bearing ring and having at least one sealing lip supported against the inner bearing ring;
    a second sealing element disposed at an axial distance to the first sealing element for effecting a two-stage sealing action, said first and second sealing elements defining a circular ring shaped sealing gap which extends in a radial direction, wherein the second sealing element is a carrier ring of the rolling-contact bearing, with the carrier ring having a terminal collar which radially extends across the annular gap to bound the sealing gap in axial direction together with the first sealing; and a sealing material disposed in the sealing gap at least in a partial region thereof.

17. The sealing arrangement of claim 16 for a rolling-contact bearing disposed in a pulley or tension roller of a traction drive.

18. The sealing arrangement of claim 16, wherein the sealing material is a grease portion.

19. A sealing arrangement for sealing on both sides of a rolling-contact bearing an annular gap which is defined between an outer bearing ring and an inner bearing ring of the rolling-contact bearing at a distance to rolling elements received between the inner and outer bearing rings, said sealing arrangement comprising:

a first sealing element securely fixed to the outer bearing ring and having at least one sealing lip supported against the inner bearing ring;

a second sealing element disposed at an axial distance to the first sealing element for effecting a two-stage sealing action, said first and second sealing elements defining a circular ring shaped sealing gap which extends in a radial direction, wherein the second sealing element is a radial shoulder formed on a housing pin for centered disposition of the rolling-contact bearing and positioned at an axial distance to the first sealing element; and a sealing material disposed in the sealing gap at least in a partial region thereof.

20. The sealing arrangement of claim 19 for a rolling-contact bearing disposed in a pulley or tension roller of a traction drive.

21. The sealing arrangement of claim 19, wherein the sealing material is a grease portion.

* * * * *